US008797926B2

(12) United States Patent
Kearney, III et al.

(10) Patent No.: US 8,797,926 B2
(45) Date of Patent: Aug. 5, 2014

(54) NETWORKED MEDIA STATION

(75) Inventors: Philip F. Kearney, III, San Jose, CA (US); Robert Dale Newberry, Jr., San Jose, CA (US); Jeffrey L. Robbin, Los Altos, CA (US); David Heller, San Jose, CA (US); Christopher R. Wysocki, Los Gatos, CA (US); Stephen Anderson Davis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 2980 days.

(21) Appl. No.: 10/862,115

(22) Filed: Jun. 4, 2004

(65) Prior Publication Data

US 2005/0273790 A1    Dec. 8, 2005

(51) Int. Cl.
*H04B 1/44*    (2006.01)
*H04L 12/28*    (2006.01)

(52) U.S. Cl.
USPC ........... 370/282; 370/259; 370/260; 370/270; 370/276; 370/278; 370/373

(58) Field of Classification Search
None
See application file for complete search history.

(56) References Cited

U.S. PATENT DOCUMENTS

| | | | | |
|---|---|---|---|---|
| 5,534,911 | A | * | 7/1996 | Levitan ............................ 725/46 |
| 5,722,041 | A | * | 2/1998 | Freadman ........................ 725/82 |
| 5,790,521 | A | | 8/1998 | Lee et al. |
| 5,815,297 | A | * | 9/1998 | Ciciora .......................... 398/112 |
| 5,931,906 | A | * | 8/1999 | Fidelibus et al. ............. 709/217 |
| 6,085,252 | A | | 7/2000 | Zhu et al. |
| 6,166,314 | A | * | 12/2000 | Weinstock et al. .......... 84/483.1 |
| 6,630,963 | B1 | | 10/2003 | Billmaier |
| 6,993,722 | B1 | * | 1/2006 | Greer et al. .................... 715/739 |
| 7,082,320 | B2 | * | 7/2006 | Kattukaran et al. ........ 455/562.1 |
| 7,260,714 | B2 | * | 8/2007 | Dawson et al. ............... 713/155 |
| 7,305,691 | B2 | * | 12/2007 | Cristofalo ........................ 725/34 |
| 7,343,553 | B1 | * | 3/2008 | Kaye .............................. 704/244 |

(Continued)

FOREIGN PATENT DOCUMENTS

| | | | |
|---|---|---|---|
| EP | 1 122 931 A2 | 8/2001 | |
| EP | 1 463 334 A2 | 9/2004 | |
| EP | 1 523 171 A1 | 4/2005 | |
| WO | WO 02/065732 | 8/2002 | .............. H04L 29/06 |
| WO | WO 03/009601 | 1/2003 | ............... H04N 7/18 |

OTHER PUBLICATIONS

"D-Link⊖s New Wireless Media Device Plays Digital Music, Videos, and Photos on Home Television and Stereo;" Jan. 20, 2004; pp. 1-2; Retrieved from the Internet: URL:http://presslink.dlink.com/pr/?prid=136.

(Continued)

*Primary Examiner* — Ayaz Sheikh
*Assistant Examiner* — Blanche Wong
(74) *Attorney, Agent, or Firm* — Park, Vaughan, Fleming & Dowler LLP

(57) ABSTRACT

Disclosed herein is a networked media station providing a variety of features including a wireless network interface, a wired network interface, a peripheral interface, and a multimedia interface. The wireless network interface(s) allows the device to communicate to serve as a wireless base station or repeater and/or a bridge between a wireless and a wired network. The peripheral interface allows the device to communicate with a variety of peripherals, and, in conjunction with the network interface(s), allows sharing of a peripheral among multiple networked computers. The multimedia interface allows the device to be used with entertainment devices for streaming of multimedia information from a network connected computer to the entertainment device. Control of various aspects of the device is preferably controlled from a network connected computer.

17 Claims, 7 Drawing Sheets

(56) References Cited

U.S. PATENT DOCUMENTS

| | | | |
|---|---|---|---|
| 7,430,753 B2 * | 9/2008 | Gray et al. | 725/80 |
| 7,996,505 B2 * | 8/2011 | Krantz et al. | 709/223 |
| 8,284,739 B2 * | 10/2012 | Doyle et al. | 370/338 |
| 2002/0133824 A1 | 9/2002 | Mensch | 725/62 |
| 2002/0164973 A1 | 11/2002 | Janik et al. | 455/403 |
| 2003/0045955 A1 | 3/2003 | Janik | 700/94 |
| 2003/0221161 A1 | 11/2003 | Balassanian et al. | |
| 2004/0133908 A1 * | 7/2004 | Smith et al. | 725/31 |
| 2004/0174896 A1 * | 9/2004 | Caspi et al. | 370/463 |
| 2004/0177063 A1 * | 9/2004 | Weber et al. | 707/3 |
| 2004/0250273 A1 * | 12/2004 | Swix et al. | 725/25 |
| 2004/0255326 A1 * | 12/2004 | Hicks et al. | 725/81 |
| 2004/0261112 A1 * | 12/2004 | Hicks et al. | 725/89 |
| 2005/0089052 A1 * | 4/2005 | Chen et al. | 370/401 |

OTHER PUBLICATIONS

Search Report From Co-Pending PCT patent application (PCT/US2005/011635) dated Jul. 28, 2005.

Palacharla, et al.; "Design and Implementation of a Real-time Multimedia Presentation System using RTP;" Computer Software and Applications Conference; Aug. 13, 1997; pp. 376-381.

Perkins C.; "RTP Audio and Video for the Internet" 2003, Addison-Wesley, pp. 107-109.

International Search Report and Written Opinion received in corresponding PCT application No. PCT/US2006/062003 dated Aug. 30, 2007.

Search Report amd Written Opinion received in Co-Pending PCT patent application (PCT/US2005/011635) dated Oct. 21, 2005.

Linksys "New Linksys Wireless Home Products Showcased at CEBIT 2004" Internet Article (Mar. 18, 2004) www.broadbandbuyer.co.uk/Shop/pageTextDetail.asp?SetID=2&TextID=473.

Schulzrinne Comumbia U A RAO Netscape R Lanphier RealNetworks H: "Real Time Streaming Protocol (RTSP)" IETF Standard, Internet Engineering Task Force, IETF, CH, April.

Schulzrinne Comumbia U A RAO Netscape R Lanphier RealNetwork H: "Real Time Streaming Protocol (RTSP)" IETF Standard, Internet Engineering Task Force, IETF, CH, Apr. 1988.

* cited by examiner

NETWORKED MEDIA STATION

BACKGROUND

With the increasing capacity and capability of personal computers, as well as improved multimedia interfaces for these computers, it has become popular to use personal computers as a repository for multimedia content, such as songs, movies, etc. Particularly with music, the increased popularity of storing multimedia information on a personal computer has resulted in a variety of products and services to serve this industry. For example, a variety of stand-alone players of encoded multimedia information have been developed, including, for example, the iPod, produced by Apple Computer of Cupertino, Calif. Additionally, services have been developed around these devices, which allow consumers to purchase music and other multimedia information in digital form suitable for storage and playback using personal computers, including, for example, the iTunes music service, also run by Apple Computer.

These products and services have resulted in an environment where many consumers use their personal computer as a primary vehicle for obtaining, storing, and accessing multimedia information. One drawback to such a system is that although the quality of multimedia playback systems for computers, e.g., displays, speakers, etc. have improved dramatically in the last several years, these systems still lag behind typical entertainment devices, e.g., stereos, televisions, projection systems, etc. in terms of performance, fidelity, and usability for the typical consumer.

Thus, it would be beneficial to provide a mechanism whereby a consumer could easily obtain, store, and access multimedia content using a personal computer, while also being able to listen, view or otherwise access this content using conventional entertainment devices, such as stereo equipment, televisions, home theatre systems, etc. Because of the increasing use of personal computers and related peripherals in the home, it would also be advantageous to integrate such a mechanism with a home networking to provide an integrated electronic environment for the consumer.

In addition to these needs, there is also increasing interest in the field of home networking, which involves allowing disparate devices in the home or workplace to recognize each other and exchange data, perhaps under the control of some central hub. To date a number of solutions in this area have involved closed systems that required the purchase of disparate components from the same vendor. For example, audio speaker systems that allow computer-controlled switching of music from one location to another may be purchased as a system from a single vendor, but they may be expensive and/or may limit the consumer's ability to mix and match components of a home network from different vendors according to her own preferences. Thus it would be beneficial to provide a mechanism by which various home networking components from differing vendors can nonetheless interact in a home network environment.

SUMMARY

The present invention relates to a networked media station. A networked media station as described herein provides a novel combination of a variety of features. This functionality is provided by integrating several interfaces and feature sets into an integrated platform, including a wireless network interface, a wired network interface, a peripheral interface, and a multimedia interface.

The wireless network interface, e.g., 802.11b or 802.11g, allows the multimedia station to communicate wirelessly with other devices and to serve as a wireless base station (for setting up a wireless network) or as a repeater (for a preexisting wireless network). The wireless network interface, in conjunction with the wired network interface, e.g., an Ethernet interface, allows the networked media station to serve as a bridge between a wireless and a wired network. To accomplish these tasks, the wireless multimedia device is equipped with switching and or routing logic.

The peripheral interface, e.g., a USB interface, may be used to allow the networked media station to communicate with a variety of peripherals. In conjunction with the wireless and/or wired network interface, this allows sharing of a single peripheral, e.g., a printer, among multiple networked computers.

The multimedia interface, e.g., an audio and/or video interface, may be used to allow the networked media station to be used in conjunction with entertainment devices, such as a stereo system, television, or home theatre system. This would allow, for example, streaming of multimedia information from a computer connected to the networked media station via wired or wireless network to an entertainment device connected to the multimedia interface. Additionally, control of certain aspects of the multimedia playback may preferably be controlled from and/or indicated at a network connected computer. Additionally, the multimedia interface may include input interfaces that act as the collection point for multimedia data to be communicated to a peer device, for example, for display on the computer.

The invention further relates to the ability to use the networked media station as a basic building block for an extensible, highly customizable home network solution. The networked media station can publish to a connected computer or other peer device the capabilities of connected entertainment devices or input devices. In this way, a user of the computer, for example, may be able to select from a number of destinations throughout, for example, a house, for delivering multimedia content or receiving multimedia input.

Another aspect of the invention involves a user interface for a computer that permits a computer to automatically detect and display to a user the availability of a multimedia source or destination remotely located at a networked media station.

DETAILED DESCRIPTION

A networked media station is described herein. The following embodiments of the invention, described in terms of devices and applications compatible with computer systems manufactured by Apple Computer, Inc. of Cupertino, Calif., are illustrative only and should not be considered limiting in any respect.

Figure 1:
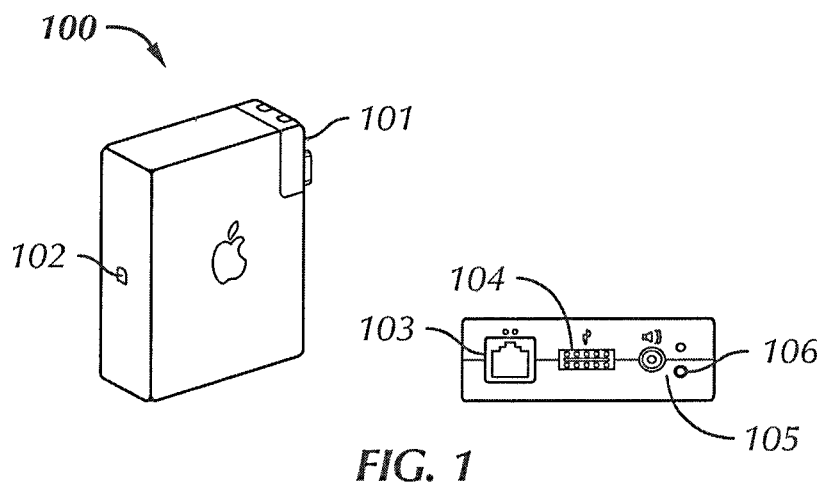
FIG. 1 illustrates an oblique side view and a bottom view of a networked media station embodying various teachings of the present disclosure.

An exemplary networked media station 100 is illustrated in FIG. 1, which shows an oblique side view and a bottom view of the networked media station. The networked media station 100 includes an AC power adapter 101, more fully illustrated in FIG. 9 below. A status light 102 provides indication of the status of the networked media station to a user. Status light 102 is preferably a light emitting diode (LED), and more preferably a combination of LEDs integrated into a single package to allow illumination in different colors, e.g., green, red, and/or amber/yellow. Various status light indications are described more fully below.

With reference to the bottom view of networked media station 100 illustrated in FIG. 1, networked media station 100 includes a wired network interface 103, a peripheral interface 104, and a multimedia interface 105. As illustrated, wired network interface 103 is an Ethernet interface, although other wired network interface types could be provided. Similarly, peripheral interface 104 is illustrated as a USB interface, although other peripheral interfaces, such as IEEE 1394 ("Firewire"), RS-232 (serial interface), IEEE 1284 (parallel interface) could also be used. Likewise multimedia interface 105 is illustrated as an audio interface including both analog line out and optical digital audio functionality. However, other multimedia interfaces, such as a video interface using composite video, S-video, component video, etc. could also be provided. As illustrated and described herein, multimedia interface could be an output interface for outputting multimedia content received by the networked media station. Alternatively, the multimedia interface could be an input interface for sending multimedia content to a destination on one of the other interfaces.

Although only one interface of each type is illustrated, multiple interfaces of one or more of the identified types could be provided. Alternatively, only a subset of the identified interfaces might be provided, or additional types of interfaces could be provided. In any case, the interfaces illustrated should be considered exemplary, as one skilled in the art would understand that a variety of interfaces, including interfaces not specifically mentioned herein, could advantageously be provided.

Another interface, wireless networking, is not illustrated in FIG. 1, but is also preferably provided in the networked media station 100. The wireless network interface preferably takes the form of a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard. The antenna required for wireless networking is not illustrated in FIG. 1, but is preferably included within the housing of networked media station 100. Such an antenna may take a variety of forms, but is preferably an antenna printed on a standard PCB (printed circuit board). Such antennas are well known to those skilled in the art. However, it would also be possible to include some form of external antenna on the exterior housing of networked media station 100 and/or to provide an additional interface for an external antenna.

A reset button 106 is also illustrated in FIG. 1, which may be used to reset the device for troubleshooting purposes. Also, it should be noted that the form factor of the networked media station is preferably such that the device is easily portable so that it may be used in a variety of locations.

Figure 9:
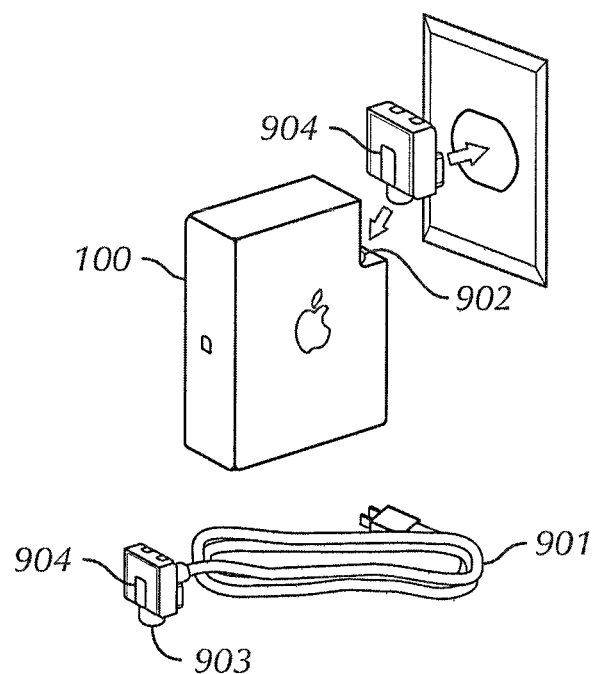
FIG. 9 illustrates the configuration of an AC power connector of a networked media station embodying certain teachings of the present disclosure.

One aspect particularly advantageous to providing the required portability is the AC power adapter 101 illustrated in FIG. 9. As can be seen in FIG. 1, the power adapter may be connected directly to networked media station 100 so as to form an essentially integrated assembly. Additionally, the power prongs may fold into the casing for networked media station 100. Alternatively, the power adapter may be removed from direct physical contact with the body of networked media adapter 100 and may instead be plugged into a wall socket and connected via power cord 901 to the networked media station. This allows the body of networked media adapter 100 to be located somewhat independently of the location of the AC power source, i.e. wall socket.

By inspection of FIG. 9, the features for interlocking AC power adapter 101 with the body of networked media adapter 100 may be more readily viewed. In general, the body of networked media adapter 100 includes power connection 902, which is adapted for receiving a power cord having a complementary connector 903. This connector may, for example, be designed so that the power can only be connected with a desired polarity. The body of networked media adapter 100 also includes a mechanical interface (not shown) in addition to the power connector 902 for mechanically attaching the power adapter separate from the electrical connection. In one embodiment, this mechanical interface takes the form of a stud, which has a complementary slot 904 in AC adapter 101, although other forms of complementary mechanical interfaces could also be provided.

As noted above, a status light 102 is provided, which is used to indicate the current status of the networked media station to the user. In one embodiment, this light may be off to indicate that the device is not powered. The light may flash in a particular color, e.g., green, to indicate that it is powering up and/or going through a startup/self-diagnostic routine. The light may illuminate in a solid color, e.g., green to indicate that it is on and functioning properly. The light may also illuminate or flash in a different color, e.g., yellow, to indicate that a problem exists, such as no wireless devices in range or no network signal.

Figure 2:
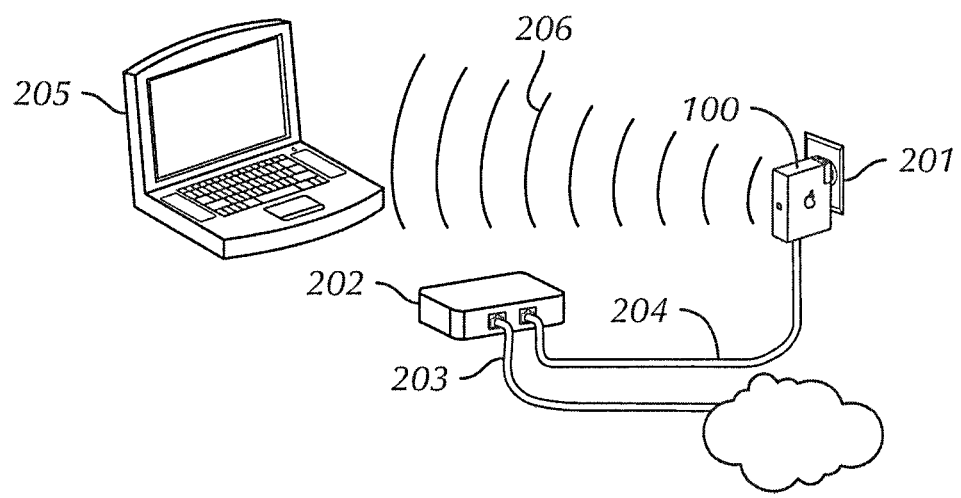
FIG. 2 illustrates a basic network connection using the networked media station of FIG. 1 to wirelessly connect a personal computer to the Internet.

A networked media station in accordance with the present invention may be configured in different ways to perform specific functions. One example is to use the networked media station as a wireless access point to provide wireless network connectivity to one or more computer devices sharing a common wired network connection, which may be, for example, a broadband Internet connection. Such a configuration of networked media station 100 is illustrated in FIG. 2. The networked media station 100 is plugged into wall socket 201, which provides power to the device. The networked media station is connected via Ethernet cable 204 to DSL or cable modem 202. DSL or cable modem 202 is connected to the Internet via wire 203. A personal computer 205 is in communication with the networked media station 100 by wireless network 206. Although described in terms of a shared broadband Internet connection, the configuration illustrated in FIG. 2 need not be so limited. The connection to the wired network port of the networked media station (via line 204) could come from any wired network device, such as a switch, router or gateway, and could connect to a LAN (local area network), a WAN (wide area network), or the Internet (as illustrated).

In this configuration, the networked media station essentially acts as a hub to interconnect computers, e.g., personal computer 205 and its peers (not illustrated) on the wireless network 206. Additionally, the networked media station may act as a DHCP (dynamic host configuration protocol) server to provide addresses to the devices on the wireless network 206, such as personal computer 205. The networked media station may also act as a DHCP client to obtain an IP address from another DHCP server on the wired network to which it is connected. In such a configuration, networked media station 100 will act as a bridge/router to transmit packets received from the wired network to the appropriate recipient on wireless network 206 and vice versa. Networked media station 100 also preferably provides some level of security, such as firewall functionality and/or network address translation. Implementations of such functionality are known to those skilled in the art, thus various implementation details are not repeated here.

It will be appreciated that the compact and integrated design described herein is particularly useful, for example, for a business traveler who wants to connect to a network, such as the Internet, from a hotel or conference room but does not want to be physically located near an available power and/or wired network connection. Such a business traveler could plug the networked media station 100 into a wall socket and wired network access point, and then be free to use a wireless enabled laptop computer or other device anywhere within range of the wireless network created thereby. When finished, the user can simply unplug the device and stow it away in a briefcase or pocket.

Figure 3:
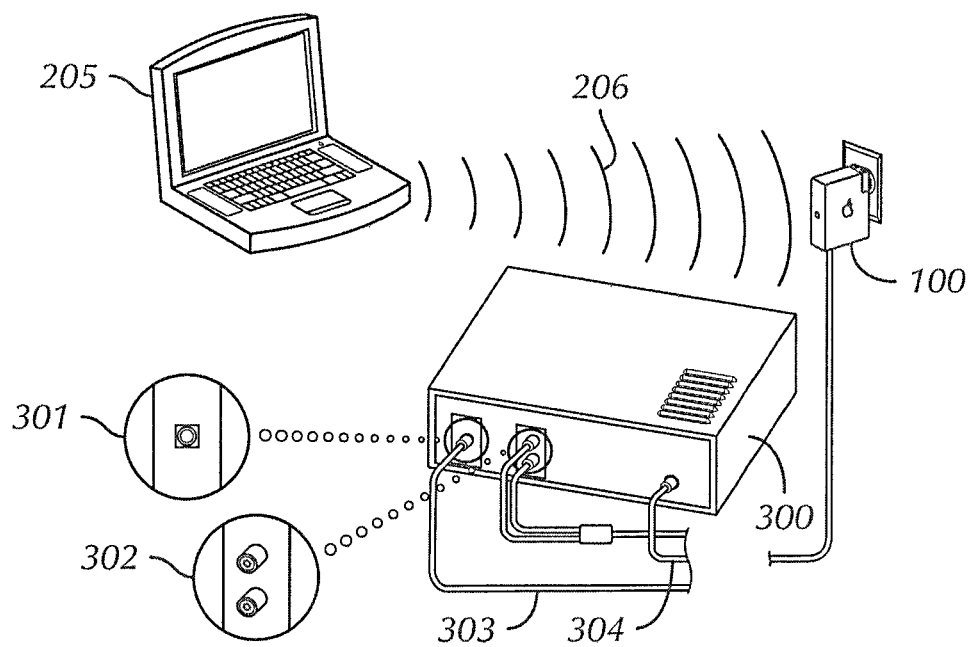
FIG. 3 illustrates a variation of the network connection of FIG. 2 in which the networked media station is connected to an entertainment device (stereo receiver) to enable multimedia content stored on a personal computer to be sent to the entertainment device over the network.

Additionally, the networked media station described herein may also be used to play multimedia content from a personal computer, e.g., audio files, on an entertainment device, e.g., a stereo system. Such a configuration is illustrated in FIG. 3. Networked media station 100 is plugged into a wall outlet for power. The networked media station acts as a wireless base station for wireless network 206 as described above with reference to FIG. 2, thus enabling computer 205 to communicate with the networked media station 100. The networked media station 100 is also connected to stereo receiver 300 to enable playback of audio files stored on computer 205 on a stereo system. The connection between networked media station 100 and stereo receiver 300 may be by way of line level audio connection or digital fiber optic connection. Either connector plugs into the multimedia port 105 (FIG. 1), which is a dual purpose analog/optical digital audio minijack. To interface with stereo receiver 300, a mini stereo to RCA cable adapter cable 304 is required, which will connect to RCA-type right and left audio input ports 302 on the stereo receiver. Alternatively a Toslink digital fiber optic cable 303 may be used, which would connect to digital audio input port 301 on stereo receiver 300.

Figure 4:
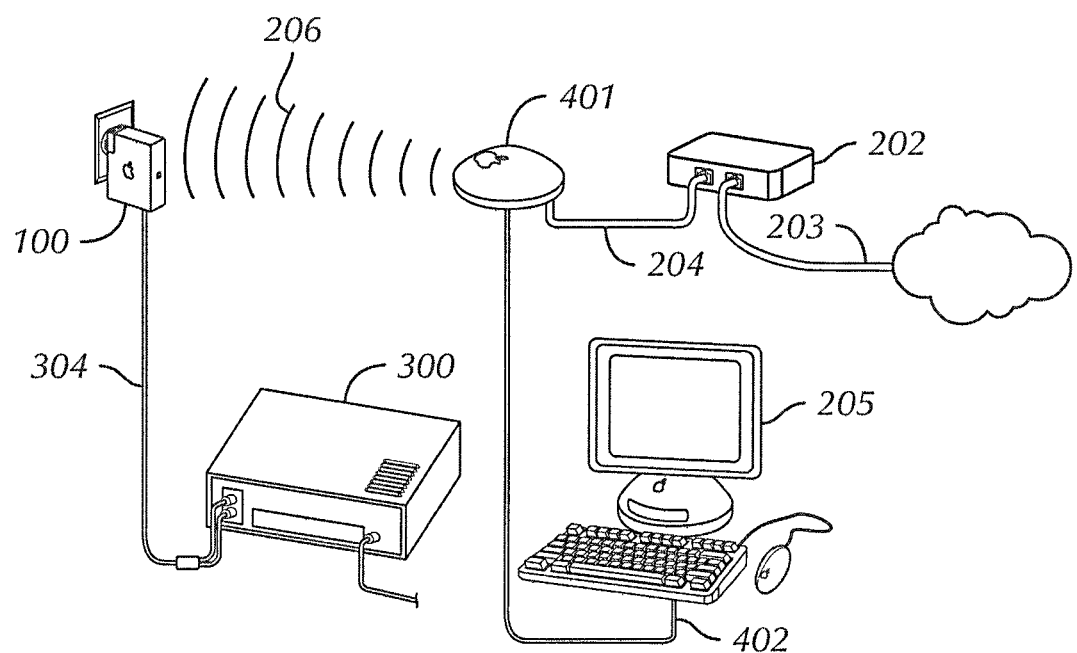
FIG. 4 illustrates a variation of the network of FIG. 3 in which the personal computer is connected to a wired network that is wirelessly bridged to the networked media station and its connected media device.
Figure 5:
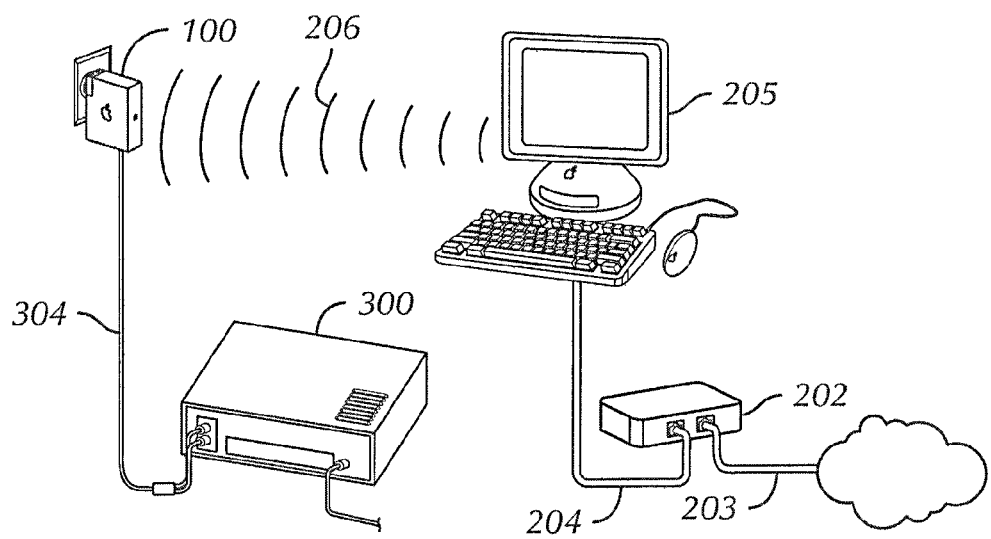
FIG. 5 illustrates yet another variation of the network of FIG. 3 in which multimedia content may be transferred wirelessly from a personal computer to a networked media station and output on an entertainment device connected thereto.
Figure 6:
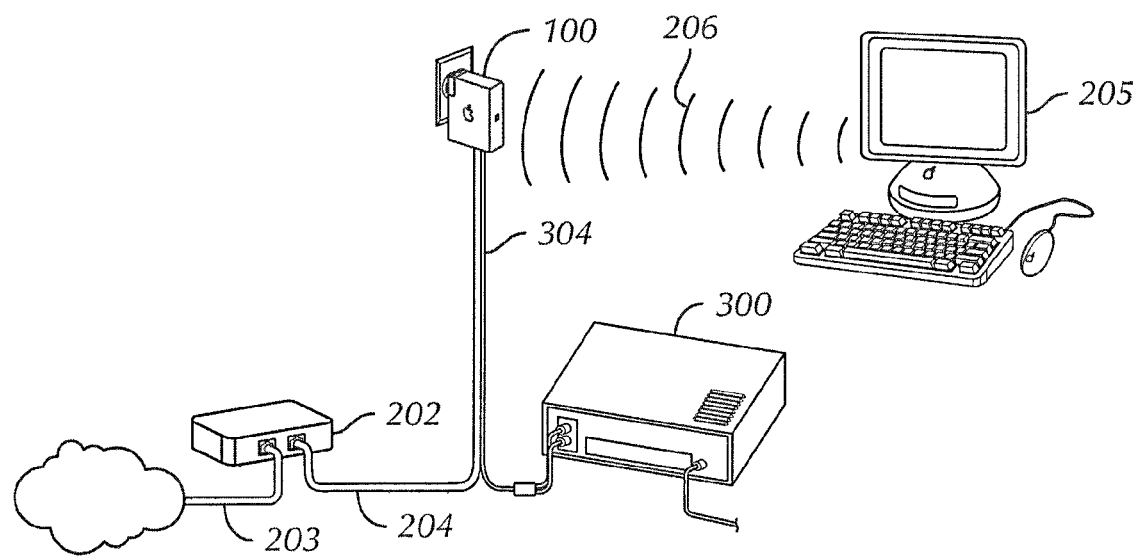
FIG. 6 illustrates still another configuration for network connection sharing and multimedia content distribution using a networked media station embodying various teachings of the present disclosure.

Various media sharing configurations using networked media station 100 are illustrated in FIGS. 4-6, where like reference numerals are used to FIGS. 1-3. In FIG. 4 personal computer 205 is equipped with an Ethernet port that is connected via connection 402 to base station 401. Base station 401 may be any variety of access point, and preferably includes wireless access, routing, switching and firewall functionality. Base station 401 is connected via cable 204 to DSL or cable modem 202, which receives an Internet connection through connection 203. This portion of the system is similar to that depicted in FIG. 2 and described above. Using such a system, multimedia files stored on computer 205 may be played using stereo receiver 300, which is connected to networked media station using the audio interface. Communication between computer 205 and the networked media station 100 connected to stereo receiver 300 is via a wired network segment (illustrated schematically by connection 402) and a wireless network segment 206. FIGS. 5 and 6 depict other alternative connection arrangements, which are variations of the above.

Figure 7:
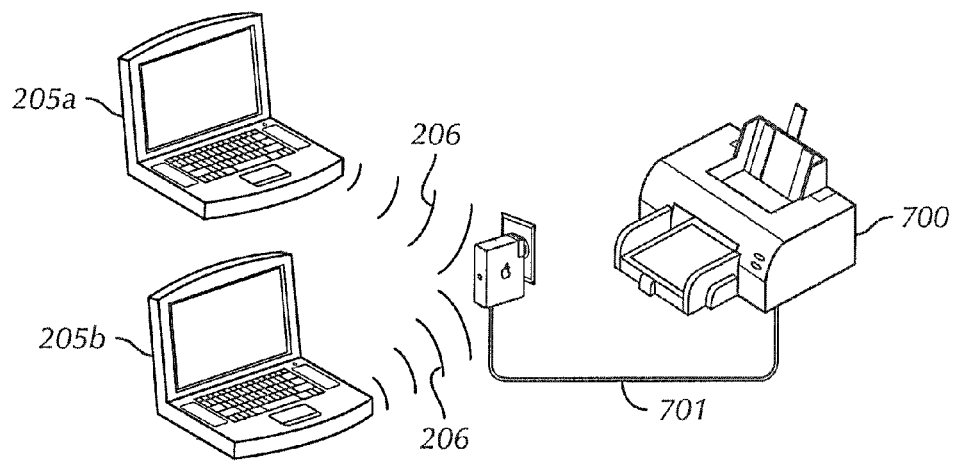
FIG. 7 illustrates a configuration of networked media station for sharing a peripheral attached to the networked media station with a plurality of computers attached to the networked media station via the network.

Yet another feature preferably supported by networked media station 100 is peripheral sharing, as illustrated in FIG. 7. Printer 700 is connected by connection 701 to the peripheral port 104 (FIG. 1), which in one embodiment is a USB port, although other types of peripheral ports may also be used. Personal computers 205a and 205b are interconnected by wireless network 206, which is set up by networked media station 100. This wireless network allows both computers to use printer 700, and also allows for file sharing between the two computers. Although described in terms of printer sharing, it would be possible to share other types of peripherals as well, including, for example, cameras (still or video), storage devices, scanners, handheld devices of various types, etc. In particular, it should also be noted that peripherals requiring bi-directional communication, may also be shared. Implementation details necessary to enable sharing of such peripherals among a plurality of computers connected on a network are generally known to those skilled in the art, and, as such, are not repeated here.

Figure 8:
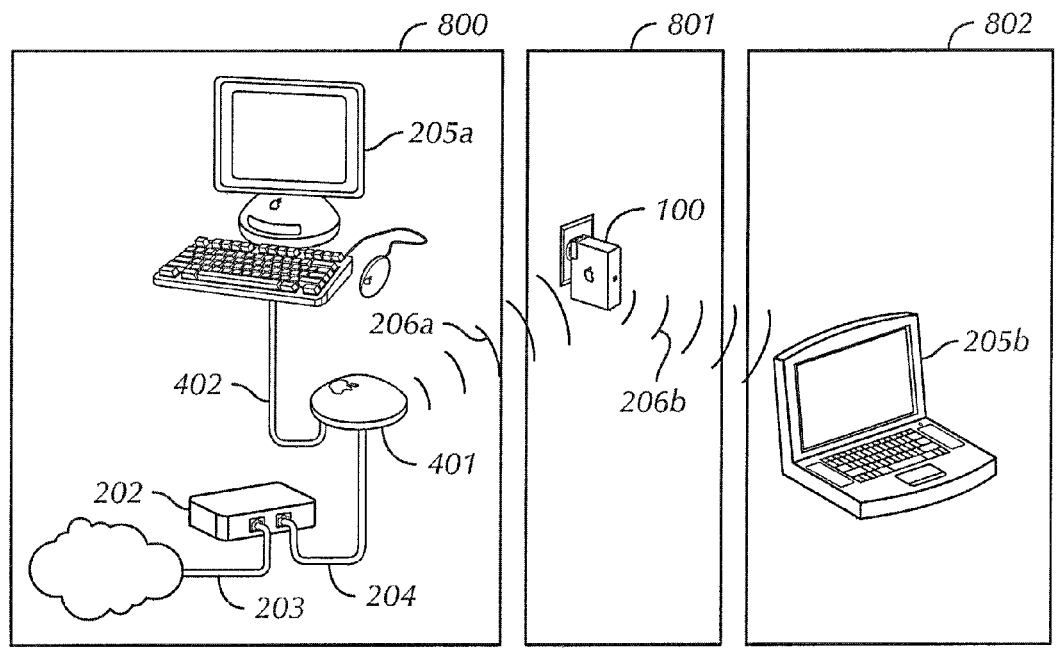
FIG. 8 illustrates another possible configuration in which a networked media station embodying various teachings of the present disclosure is used to extend the range of a wireless network.

Still another desirable feature of networked media station 100 is illustrated in FIG. 8, which is extending the range of an existing wireless network. Schematically depicted in FIG. 8 are three rooms, for example, in a typical house. In family room 800 a network arrangement similar to that described above with reference to FIG. 4 is set up. In living room 802 a user wishes to connect to the Internet or use other network resources; however, this room may be beyond the range of wireless network 206a set up by base station 401. By locating networked media station 100 in an intermediate room 801, the range of the wireless network may be extended (206b) enabling personal computer 205b to access network resources that would otherwise be out of range. This interconnectivity is preferably provided using a Wireless Distribution System (WDS) as specified by the IEEE 802.11 standard.

As briefly described above, one novel feature of networked media station 100 is the ability to receive multimedia information from a computer over a network connection and output this media information to an entertainment device. Although it is contemplated that audio, video, audio/video, and/or other forms of multimedia may be used with the networked media station described herein, one exemplary embodiment relates to the sharing of audio data stored on a personal computer with an entertainment device, such as a stereo system. One such configuration was described above with respect to FIG. 3. The following is a description of various implementation details of such a system implemented using hardware and software developed by Apple Computer. Although certain details are somewhat specific to such an implementation, various principles described are also generally applicable to other forms of hardware and/or software.

Figure 10:
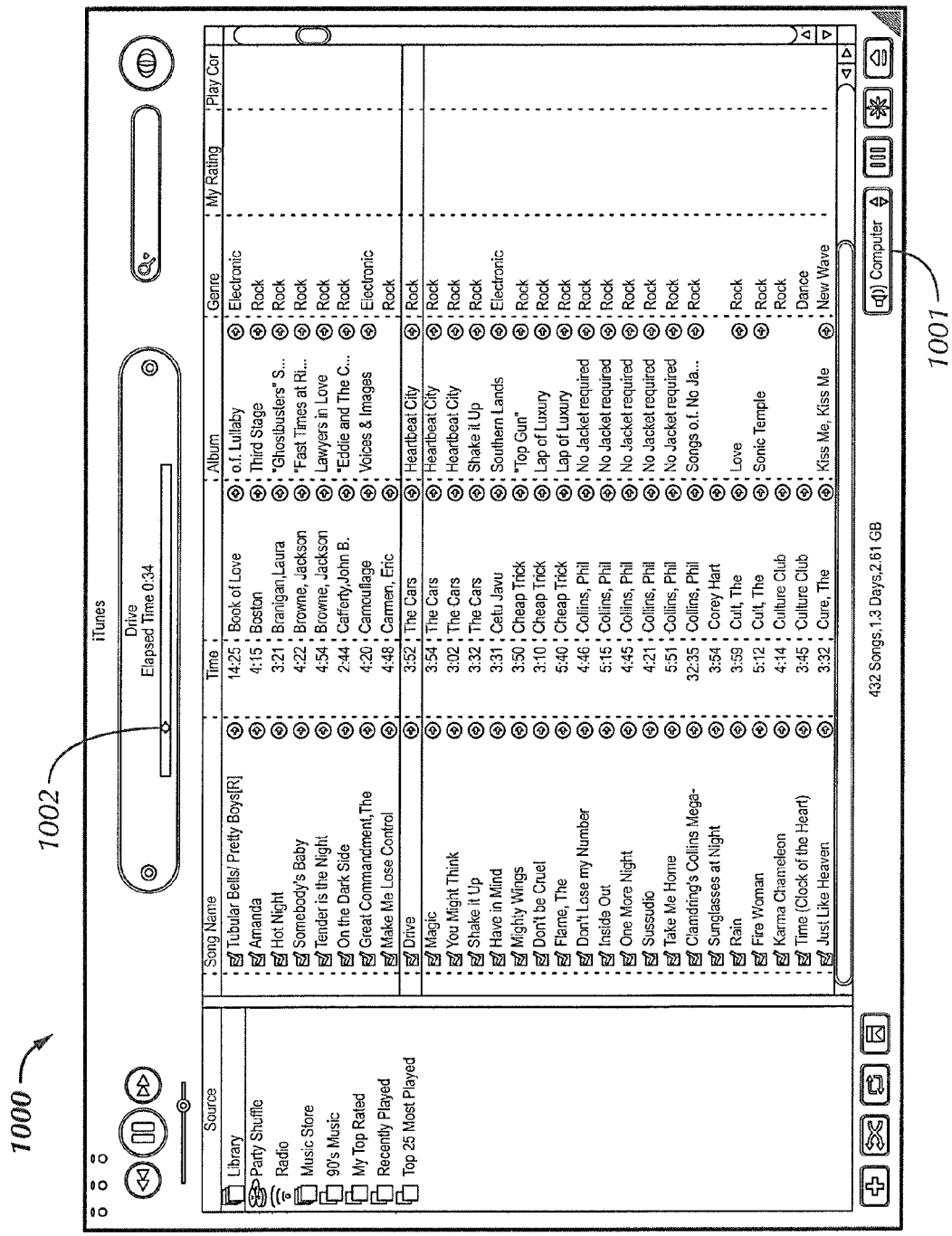
FIG. 10 illustrates a screen image of an exemplary software interface to a networked media station embodying various teachings according to the present disclosure.

To provide a relatively simple and user friendly interface to the media sharing features of networked media station 100, it is advantageous to provide access to the device from a media application running on the personal computer 205, which is also preferably the application normally used to create, manipulate, or otherwise access the particular type of media file. In one exemplary embodiment, this could be the iTunes software for music file management and playback produced by Apple Computer. In the iTunes interface screen 1000, illustrated in FIG. 10, the networked media station may be selected as a destination for media playback using icon 1001. The system can be programmed such that the audio content of the media file will be sent to the networked media station 100, while system sounds (e.g., beeps, alerts, etc.) will continue to be played back on personal computer 205 using the system speakers.

Interface between the personal computer 205 and portable media station 100 over the network (e.g., wireless network 206) is initiated through a discovery process. One example of such a discovery process uses Rendezvous, which is a technology that enables automatic discovery of computers, devices, and services on IP networks. Also known as Zero Configuration Networking, Rendezvous uses standard IP protocols to allow devices to automatically find each other without the need for a user to enter IP addresses or configure DNS servers. Various aspects of Rendezvous are generally known to those skilled in the art, and are disclosed in the white paper entitled "Rendezvous" dated October, 2003, and published by Apple Computer, which is hereby incorporated by reference in its entirety. Additional implementation details may be found in the following co-pending patent applications, commonly owned with the present application, which are hereby incorporated by reference in their entirety: "Method and Apparatus for Configuring a Wireless Device Through Reverse Advertising," Ser. No. 10/102,321, filed Mar. 19, 2002; "Method and Apparatus for Supporting Duplicate Suppression When Issuing Multicast DNS Queries Using DNS_Format Message Packets," Ser. No. 10/102,174, filed Mar. 19, 2002; and "Method and Apparatus for Implemented a Sleep Proxy for Services on a Network," Ser. No. 60/496,842, filed Aug. 20, 2003.

To provide the media sharing functionality described herein, networked media station 100 will advertise over the network that it supports audio streaming. As required for standard Rendezvous operation, the networked media station will publish the availability of a service, the name of the device providing the service, the network address of the device, and one or more configuration parameters that are related to the service. In case of audio file playback on a remote device, the service provided would be newly defined Rendezvous service _raop._tcp ("remote audio output protocol"). The registration of this service advertises particular audio capabilities of the system (e.g., 44.1 kHz sample rate, 16-bit sample size, and 2-channel/stereo samples). The registration of the service might also include security, encryption, compression, and other capabilities and/or parameters that are necessary for communicating with the device.

In alternative embodiments, additional services may be designed to specify a variety of parameters relating to one or more multimedia input or output devices attached to the portable media station. Devices that might have particular applicability in a home network environment include speakers, video display terminals, cameras, microphones, etc. For example, a variety of input devices interfaced into one or more networked media stations could provide the basis for a home security system (using cameras, motion detectors, microphones, etc.)

The automatic discovery aspects of the present invention permit its use in architecting easily configured home networks according to a user's preferences and designs. For example, a user with a large library of music on a computer in one room of a house can create a wireless multimedia network for his entire home simply by deploying a few of the disclosed networked media stations throughout his home. For example, he can put one near the stereo in the living room, and one by the television in the bedroom. By connecting the appropriate multimedia interface, he can serve audio, video, or other content to these devices with a simple selection at his computer. For example, he may direct the living room stereo to play his favorite album, and he may direct the bedroom television to show a home movie. This extensible architecture allows a user to configure relationships between sources and destinations of media data without regard for buying all components from the same vendor, or other such considerations that might otherwise be required to permit interoperability of disparate devices on a wireless network.

The media software running on personal computer 205, e.g., iTunes, will discover the networked media station 100 via the Rendezvous records, will recognize this device as a destination for audio data, and will automatically provide the particular device as a selectable destination within the user interface. (See FIG. 10, reference numeral 1001.) When the user selects a particular networked media station 100 from those available, a variety of authentication and security exchanges will take place. For example, if password protection is provided as a security feature, the user may be prompted for a password required to use networked media station 100 for audio file playback. Additionally, if the user attempts to select a device that is already in use (for example, by another user), the networked media station will send a message indicating that it is busy through the user interface.

Another aspect of the present invention relating to a device already in use relates to the connection teardown procedure that may be implemented in accordance with the present invention. Once a connection is established between a media source, e.g., a personal computer, and the networked media station, the connection remains open so long as media data is being transmitted. Once media data is no longer being transmitted, for example, at the end of playback of a song or album, the connection enters an "idle" state. While in this idle state, the media source can begin successfully transmitting data at any time, as the connection has not been torn down. Thus it would not be necessary to renegotiate or otherwise reestablish the connection.

However, while the networked media station has a connection in this "idle" state, it will also accept an attempt to establish a connection with another media source. If such an attempt occurs, the connection with the first source will be torn down and a new connection will be established. Preferably the first source will also be notified that its connection has been terminated.

Additionally, for digital rights management purposes, it may be desirable to determine that networked media station 100 is authorized to receive an audio data stream and/or that the communications link between the personal computer and the networked media station is secure (encrypted). This requires some form of authentication, and is preferably based on a public key/private key system. In one embodiment, each networked media station 100 may be provided with a plurality of private keys embedded in read only memory (ROM). The media software is then provided with a corresponding plurality of public keys. This allows identification data transmitted from the networked media station 100 to the media software to be digitally signed by the networked media station using its private key, by which it can be authenticated by the media software using the appropriate public key. Similarly, data sent from the media software to the networked media station may be encrypted using a public key so that only a networked media station using the corresponding private key can decrypt the data. The media software and networked media station may determine which of their respective pluralities of keys to use based on the exchange of a key index, telling them which of their respective keys to use without the necessity of transmitting entire keys.

It is preferable that authentication of a networked media station 100 occur upon initial establishment of a connection to the media software. Upon successful authentication, the media software running on personal computer 205 will open a network connection to the networked media station's audio channel and begin sending data. It is notable that data is "pushed" from the media software to networked media station rather than being "pulled" by the networked media station from the media software. The networked media station receives this audio data, buffers some portion of the data, and begins playing back the audio data once the buffer has reached a predetermined capacity. For example, the networked media station may have a total of 8 seconds of buffering, but may begin playback when 2 seconds of audio data have been received. Additionally, it is also possible for the buffer to have a varying capacity, determined, for example, by network traffic or reliability conditions.

In a preferred embodiment, the audio channel is separate from the control channel, i.e., the channel used to set up the connection. For reasons explained below, it is advantageous to have the data channel separate from the control channel. However, a single channel could be used for data and control information.

One advantage to using separate control and data channels is improved response to user commands. As noted above, networked media station 100 includes buffering of data, which compensates for network delays, latency, etc. If control commands are included in the data stream, these commands would not be reached until the networked media station played through the buffer, meaning there would be a delay of up to several seconds before implementing the user command. This is obviously undesirable, and thus a separate channel for control data provides an enhanced user experience.

The packets sent over the data channel (in this example the audio data) are preferably TCP packets in the general form specified by the real time streaming protocol (RTSP) standard. RTSP is a standard communication protocol known to those skilled in the art. Therefore implementation details of such a system are not discussed here, although they may be found in Real Time Streaming Protocol Specification dated Feb. 16, 2004, and prior versions, presently available from http://www.rtsp.org and which are hereby incorporated by reference in their entirety. Additionally, although TCP (transmission control protocol) is preferably used because of its robustness, UDP (user datagram protocol) may also be used, particularly in applications where the overhead associated with TCP would be undesirable.

In either case, the data packets will use RTP (real time protocol) headers, and will include both sequence numbers and time stamp information. However, when TCP is used, this sequence and time stamp information is not required for detecting missing packets or reordering packets because TCP automatically provides guaranteed packet delivery and correct sequencing. However, the timing and sequence information is useful for feedback from the networked media station to the media control software.

For example, the networked media station may periodically provide information about where it is in the playback of the media stream. This may be accomplished by the networked media station's transmitting over the control channel an indication of the packet currently being played back. Alternatively the networked media station may indicate the packet just received as well as the status of the device's buffers. This information is useful to the media software for multiple purposes. For example, if the media software determines that the buffers on the networked media station are low, additional data may be transmitted to the device in faster than real time, to insure that the device's buffers do not become completely empty. This information may also be used by the media software for synchronizing visual effects displayed on the monitor of personal computer 205 with the sound being output from the networked media station. Visual effects to be synchronized with the audio playback may take a variety of forms, including scrubber bar playhead 1002 (FIG. 10), which indicates where in the file audio data is currently being played back from, or various artistic "visualizations," which provide visual effects that are synchronized with the "beats" of the music. In addition, extension of this control channel could allow for control of the entertainment device to be accomplished from elsewhere on the network, for example, a user could adjust the playback volume of a stereo in one room from a personal computer in another part of the house.

Another use for the packet sequence and time stamp information relates to the case in which the networked media station receives an instruction to stop playback and discard all data received up to that point. In such a case, buffering by the networked media station requires that the packets to be discarded be identified, which is most readily accomplished using the sequence and timestamp information.

The data payload of the RTP packets contains the audio information to be played back by the networked media station. In a preferred embodiment, media files may be stored on personal computer 205 in one or more formats, including, for example, MP3 (Motion Picture Expert's Group Layer 3), AAC (Advanced Audio Coding a/k/a MPEG-4 audio), WMA (Windows Media Audio), etc. The media software running on the personal computer decodes these various audio formats, eliminating the need for the networked media station 100 to include decoders for multiple formats. This also reduces the hardware performance requirements of networked media station 100. Yet another advantage of performing decoding on the personal computer is that various effects may be applied to the audio stream, for example, cross fading between tracks, volume control, equalization, and/or other audio effects. Many of these effects would be difficult or impossible to apply if the networked media station were to apply them, for example, because of computational resources required.

The decoded audio data is preferably compressed by personal computer 205 before transmission to networked media station 100. This compression is most preferably accomplished using a lossless compression algorithm to provide maximum audio fidelity. One suitable compressor is the Apple Lossless Encoder, which is available in conjunction with Apple's iTunes software. Networked media station 100 does require a decoder for the compression codec used. It is also preferable that the data stream sent from personal computer 205 to the networked media station 100 be encrypted. One suitable form of encryption is AES using a pre-defined key determined as described above.

Figure 11:
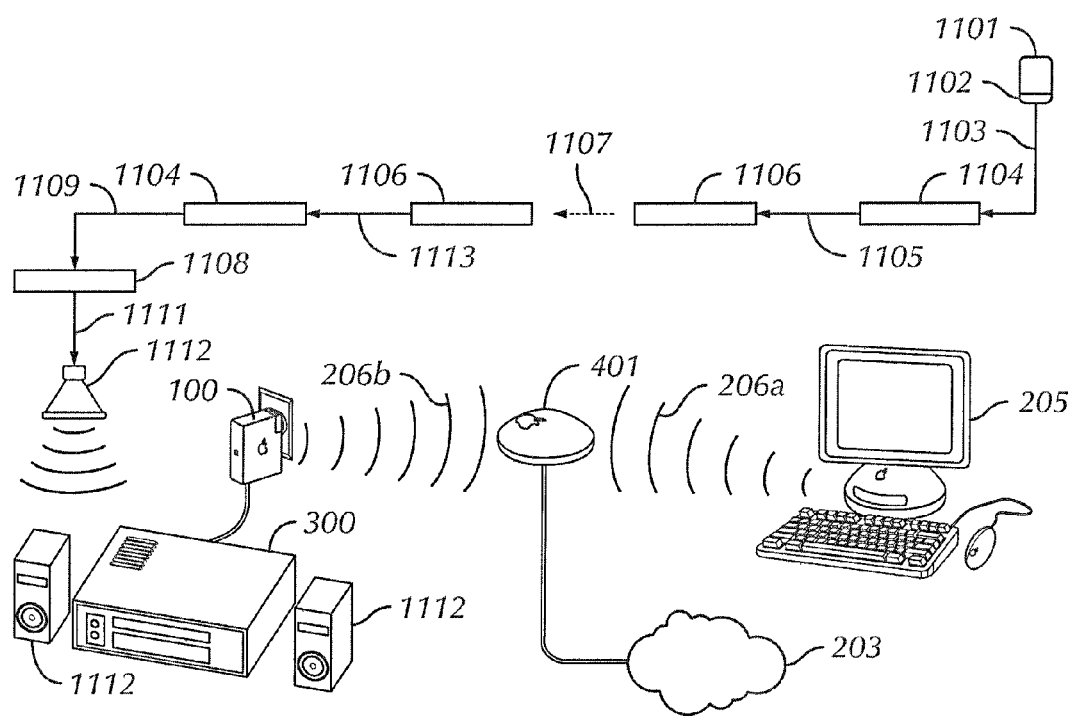
FIG. 11 illustrates the flow of multimedia data in one embodiment of the present invention.

The process of transferring audio data from a network connected computer to an entertainment device using networked media station may be more clearly understood with reference to FIG. 11. Personal computer 205 is connected to a wireless network 206 established by access point 401. Access point 401 also provides for a shared connection to network 203, e.g., the Internet. Networked media station 100 is also connected to the wireless network 206, and has its multimedia port connected to stereo receiver 300, having output speakers 1112.

A digital media file 1101, for example, a song stored in AAC format, is stored on personal computer 205. Once a connection is established between the computer 205 and networked media station 100 and playback is started, a portion 1102 of the media file is transcoded in step 1103 from the format it is stored in (e.g., AAC) to a format that is understood by networked media station 100 (e.g., the Apple Lossless encoder). This transcoding step is not necessarily required if the file is stored on personal computer 205 in a format that is understood by the networked media station. In any case, a block for transmission 1104 is created and encrypted in step 1105 to result in a transmitted block 1106. Again, this encryption step is not necessarily required, but is advantageous for digital rights management purposes. Each of these steps (transcoding and encryption) is preferably performed on personal computer 205.

Once the transmitted block is transmitted across wireless network 206 to networked media station 100 (transmission is step 1107), the decoding process begins. In step 1113, the received block 1106 (identical to transmitted block 1106) is decrypted, resulting in decrypted block 1104 (identical to block for transmission 1104). In step 1109, this data block is processed to decode the encoding performed in step 1103, resulting in raw audio block 1108, which may be, for example, in the form of PCM data. This data block is converted to an analog audio signal by a digital to audio converter (DAC) and output through stereo receiver 300 to loudspeakers 1112.

It should be noted that various buffering, error checking, and other data transfer steps implicit in various forms of networking have been omitted from the foregoing description. Nonetheless, these steps are preferably present and may be implemented in accordance with a variety of techniques known to those skilled in the art and/or disclosed herein. It also bears mentioning that certain steps may be omitted, for example, transcoding step 1103 is not required if media file 1101 is encoded in a format that can be decoded directly by networked media station 100. Additionally, in addition to the streaming mode of operation described above, sufficient storage could be provided on the networked media station 100 to allow media content to be stored thereon, either transferred from the original source or obtained from an independent source.

While the invention has been disclosed with respect to a limited number of embodiments, numerous modifications and variations will be appreciated by those skilled in the art. For example, for this disclosure, the term "computer" does not necessarily mean any particular kind of device, combination of hardware and/or software, nor should it be considered restricted to either a multi purpose or single purpose device.

Additionally, although the invention has been described particularly with respect to the output or distribution of multimedia information, it should be understood that the inventive concepts disclosed herein are also generally applicable to the input or collection of such information. It is intended that all such variations and modifications fall with in the scope of the following claims.

What is claimed is:

1. A method of outputting multimedia content stored on a computer to an entertainment device over a network, the method comprising:
   identifying, by the computer, one or more networked media stations connected to the network, wherein at least one of the identified one or more networked media stations has at least one entertainment device connected thereto;
   providing, by the computer, a listing of the identified one or more networked media stations as selectable options on a user interface of the computer;
   receiving, by the computer, a user input selecting a first networked media station from among the identified one or more networked media stations, wherein the first networked media station is coupled to the entertainment device;
   opening, by the computer, a communications link with the first networked media station; and
   pushing, by the computer, multimedia content stored on the computer to the first networked media station, whereby the first networked media station outputs the multimedia content to the entertainment device, wherein pushing the multimedia content to the first networked media station comprises:
      decoding multimedia data from the multimedia content to generate decoded multimedia data;
      re-encoding the decoded multimedia data for the multimedia content to generate re-encoded multimedia data; and
      pushing the re-encoded multimedia data to the first networked media station.

2. The method of claim 1, wherein identifying one or more networked media stations comprises:
   automatically detecting the presence of the one or more networked media stations; and
   determining a multimedia capability of the one or more networked media stations.

3. The method of claim 1, wherein opening the communications link with the first networked media station corresponding to the entertainment device further comprises:
   performing, by the computer, an authentication to determine whether the first networked media station is authorized to receive multimedia content.

4. The method of claim 3, further comprising encrypting the decoded multimedia data.

5. The method of claim 3, further comprising encrypting the re-encoded multimedia data.

6. The method of claim 1, further comprising encrypting the decoded multimedia data.

7. The method of claim 1, further comprising encrypting the re-encoded multimedia data.

8. An electronically readable non-transitory storage medium having encoded thereon instructions executable by a computer for performing a method comprising:
   identifying one or more networked media stations connected to the network, wherein at least one of the identified one or more networked media stations has at least one entertainment device connected thereto;

providing a listing of the identified one or more networked media stations as selectable options on a user interface of the computer;

receiving a user input selecting a first networked media station from among the identified one or more networked media stations, wherein the first networked media station is coupled to the entertainment device;

opening a communications link with the first networked media station; and pushing multimedia content stored on the computer to the first networked media station, whereby the first networked media station will output the multimedia content to the entertainment device, wherein pushing the multimedia content to the first networked media station comprises:

decoding multimedia data from the multimedia content to generate decoded multimedia data;

re-encoding the decoded multimedia data for the multimedia content to generate re-encoded multimedia data; and pushing the re-encoded multimedia data to the first networked media station.

9. The storage medium of claim 8, wherein identifying one or more networked media stations comprises:

automatically detecting the presence of the one or more networked media stations; and determining a multimedia capability of the one or more networked media stations.

10. The storage medium of claim 8, wherein opening the communications link with the first networked media station corresponding to the entertainment device further comprises:

performing an authentication to determine whether the first networked media station is authorized to receive multimedia content.

11. The storage medium of claim 8, further comprising encrypting the decoded multimedia data.

12. The storage medium of claim 8, further comprising encrypting the re-encoded multimedia data before pushing.

13. A computer, comprising:
a processing system;
a network interface that is coupled to a network; and
a user interface;
wherein the processing system and the network interface perform operations for:

identifying one or more networked media stations connected to the network;

providing a listing of the one or more networked media stations as selectable options on the user interface;

receiving a user input selecting a first networked media station from among the one or more networked media stations, wherein the first networked media station is coupled to an entertainment device;

opening a communications link with the first networked media station; and pushing multimedia content stored on the computer to the first networked media station via the communications link, whereby the first networked media station outputs the multimedia content to the entertainment device, wherein pushing the multimedia content comprises:

decoding multimedia data from the multimedia content to generate decoded multimedia data;

re-encoding the decoded multimedia data for the multimedia content to generate re-encoded multimedia data; and pushing the re-encoded multimedia data to the first networked media station.

14. The computer of claim 13, wherein, when identifying the one or more networked media stations, the processing system and the network interface perform operations for:

detecting the presence of the one or more networked media stations; and determining a multimedia capability of the one or more networked media stations.

15. The computer of claim 13, wherein, when opening the communications link with the first networked media station, the processing system and the network interface perform operations for:

performing an authentication to determine whether the first networked media station is authorized to receive multimedia content.

16. The computer of claim 13, wherein the processing system and the network interface perform operations for encrypting the decoded multimedia data.

17. The computer of claim 13, wherein the processing system and the network interface perform operations for encrypting the re-encoded multimedia data.

* * * * *